A. E. NORRIS.
HOISTING APPARATUS.
APPLICATION FILED JAN. 3, 1916.

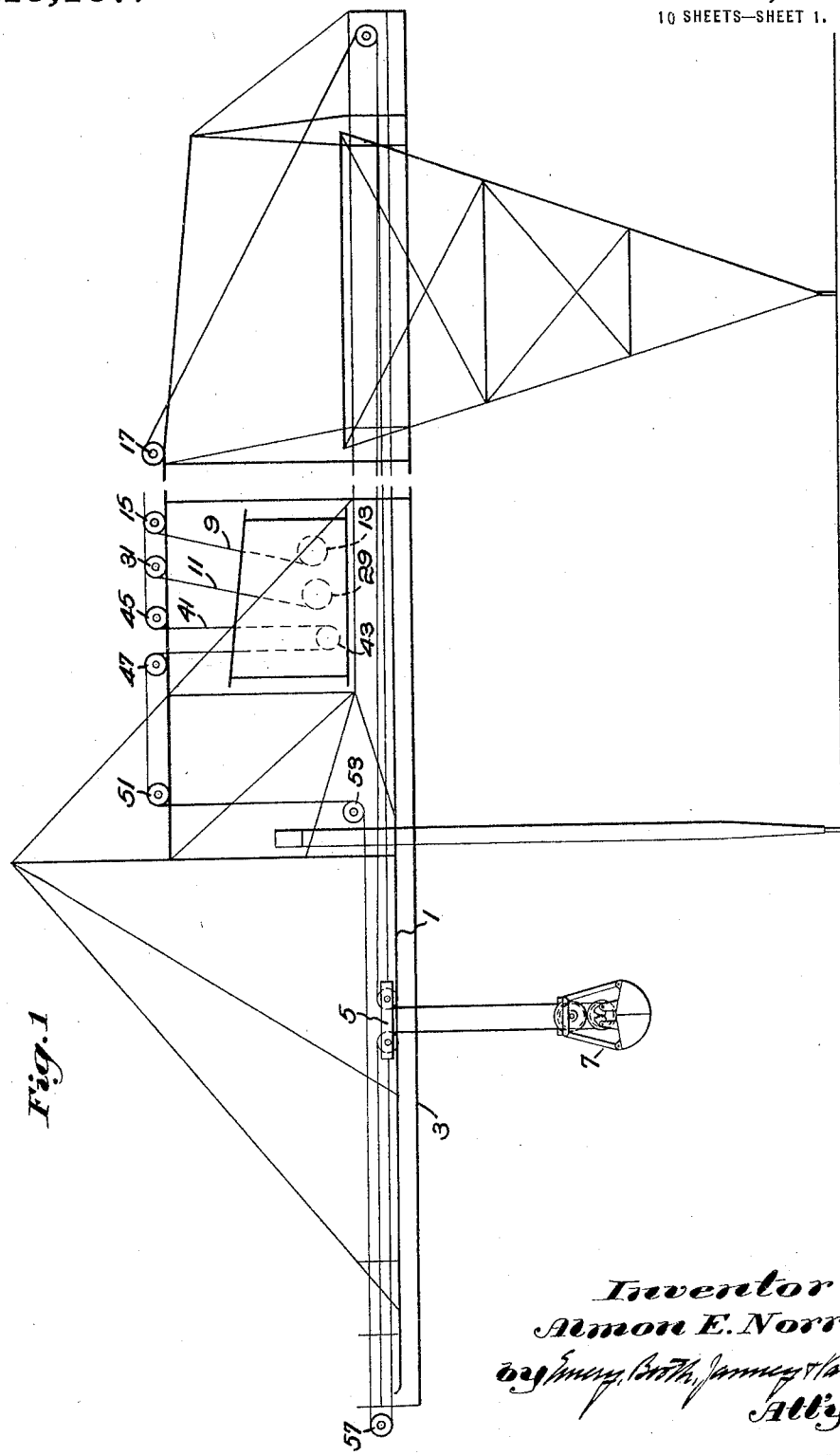

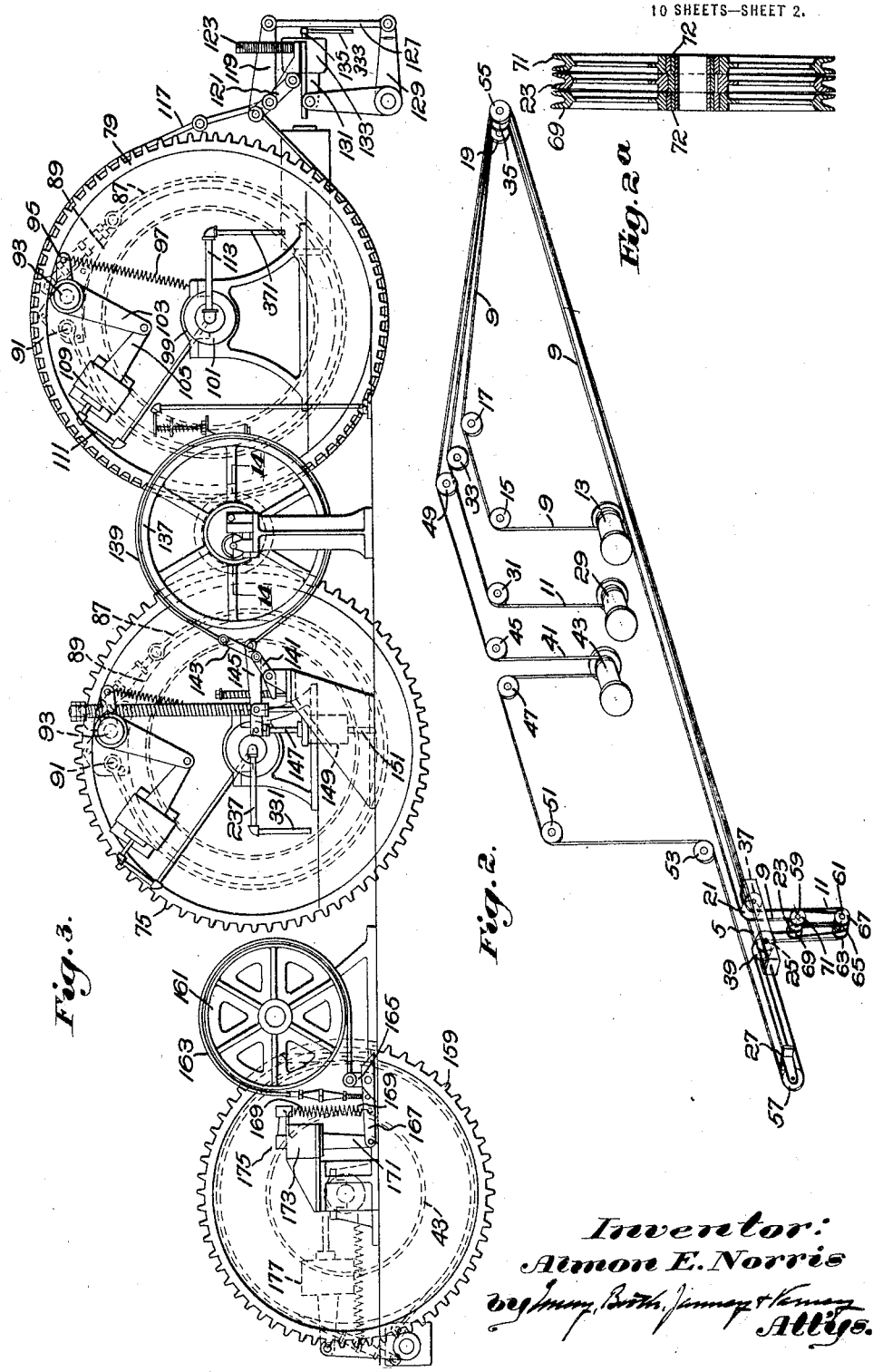

1,419,167.

Patented June 13, 1922.
10 SHEETS—SHEET 3.

Inventor:
Almon E. Norris

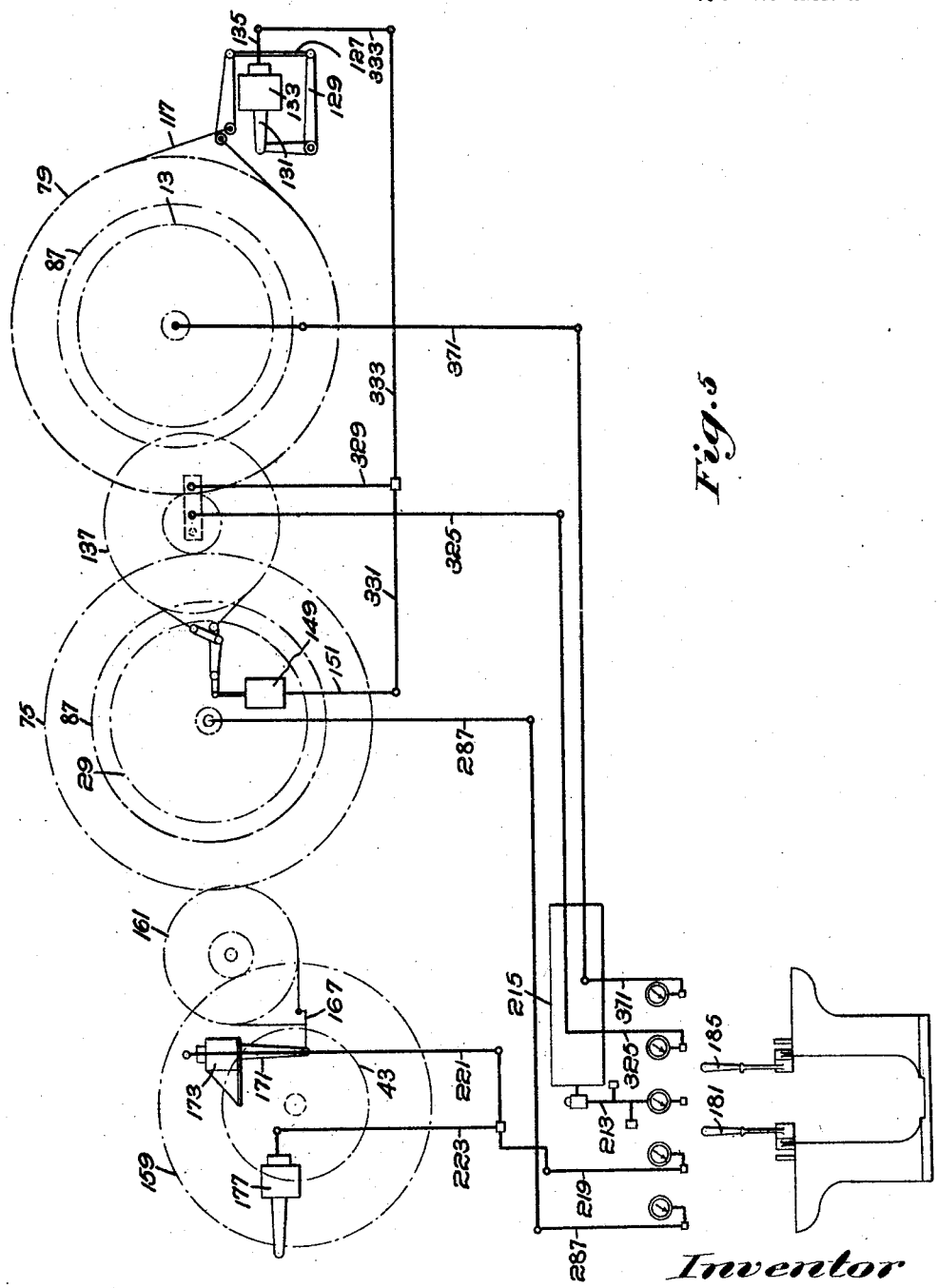

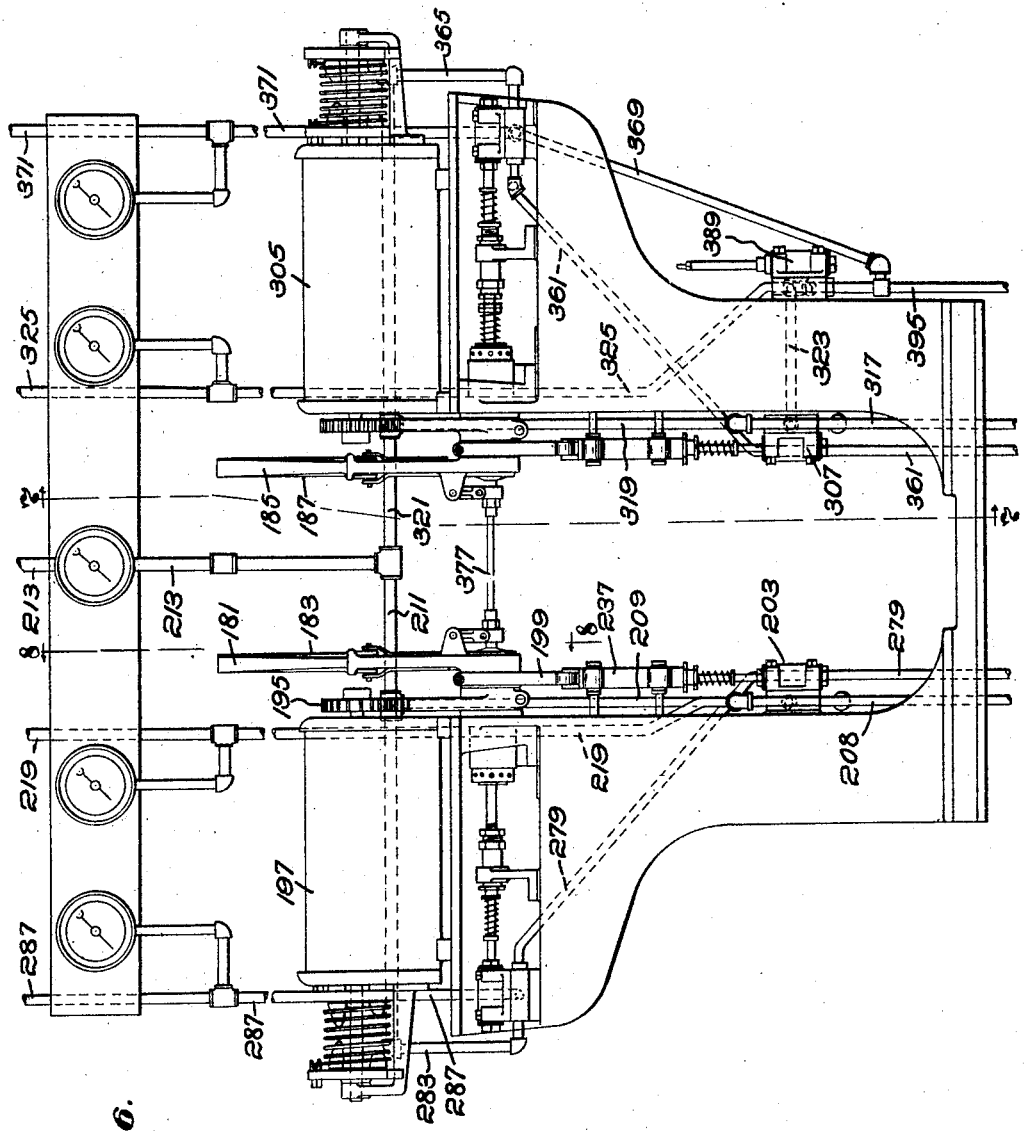

A. E. NORRIS.
HOISTING APPARATUS.
APPLICATION FILED JAN. 3, 1916.
1,419,167.
Patented June 13, 1922.
10 SHEETS—SHEET 6.
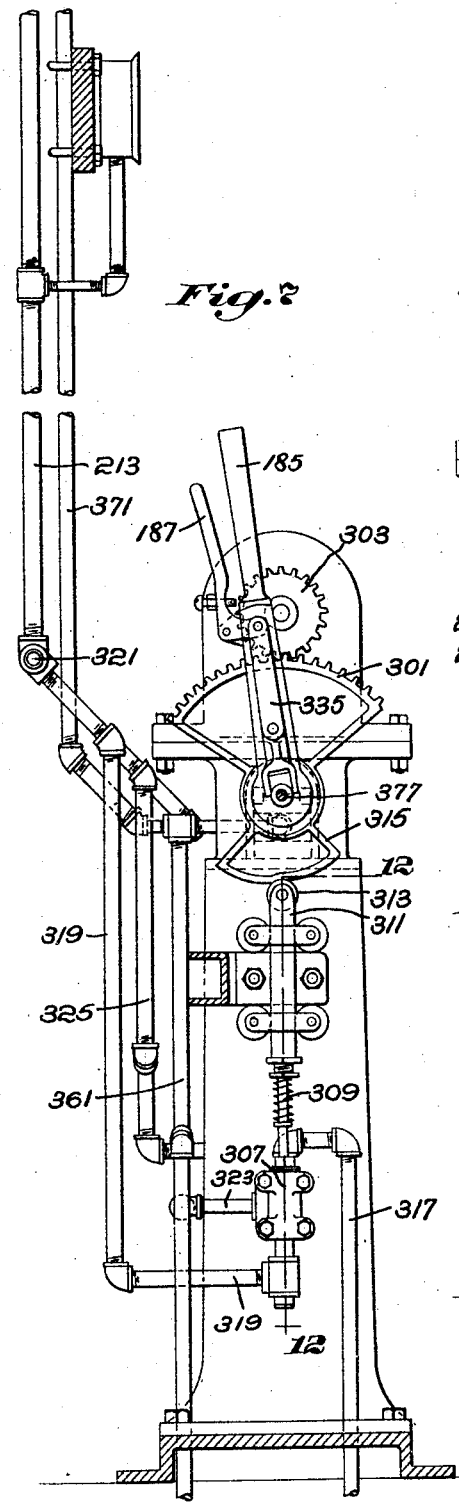
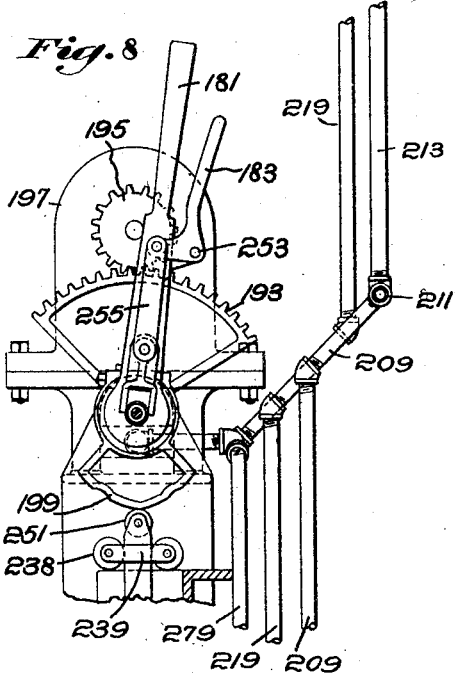
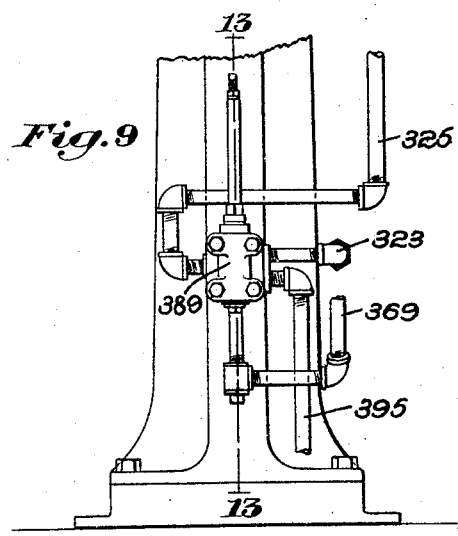
Inventor
Almon E. Norris A. E. NORRIS.
HOISTING APPARATUS.
APPLICATION FILED JAN. 3, 1916.
1,419,167.
Patented June 13, 1922.
10 SHEETS—SHEET 7.
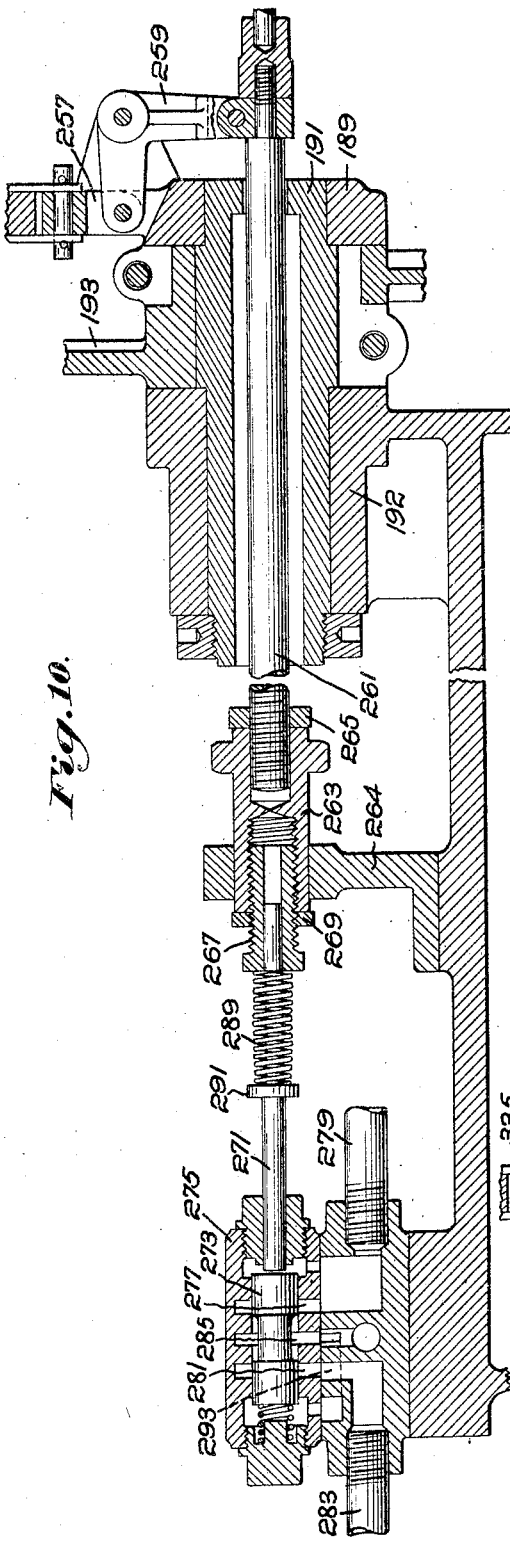
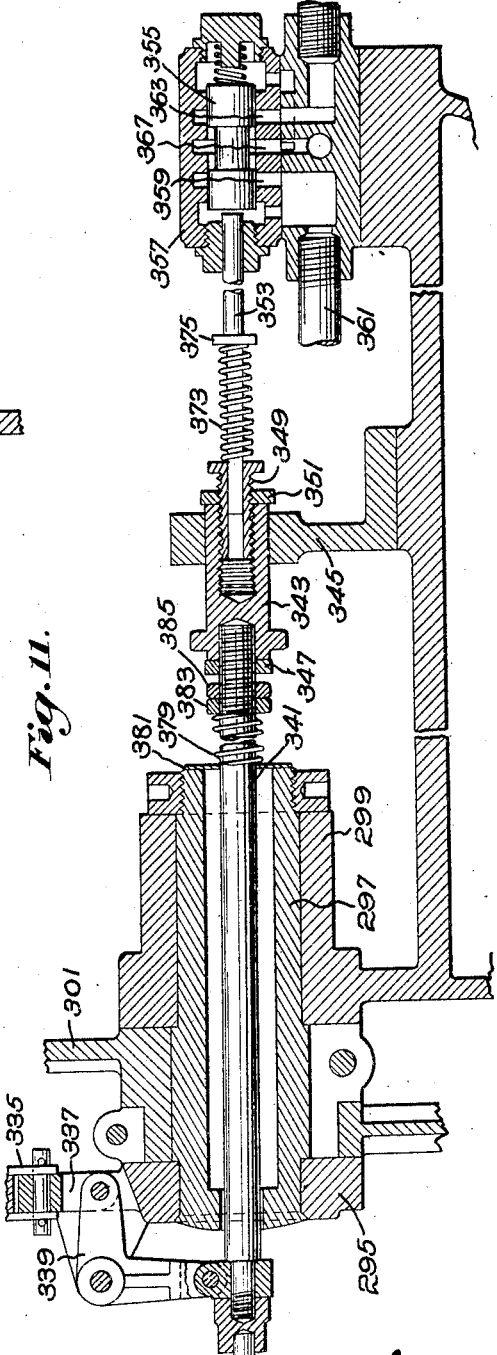
Inventor:
Almon E. Norris

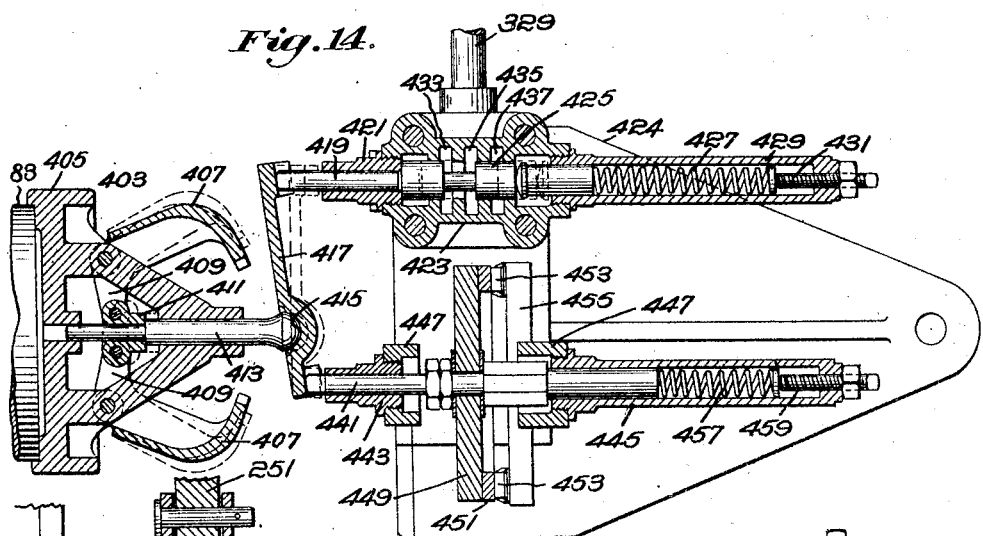
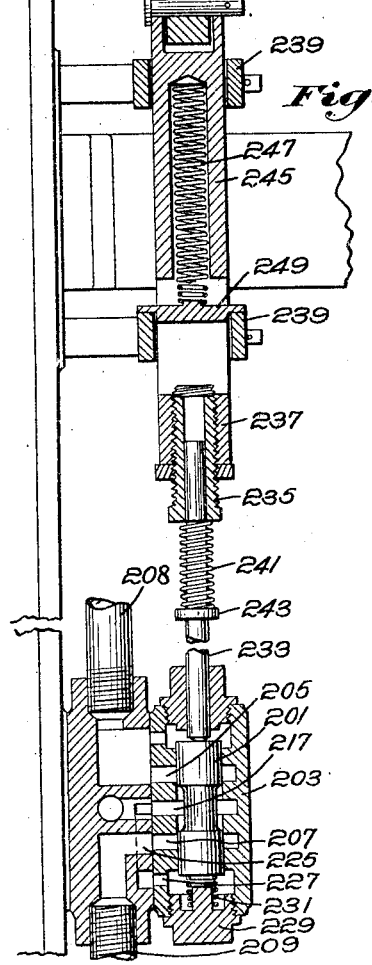
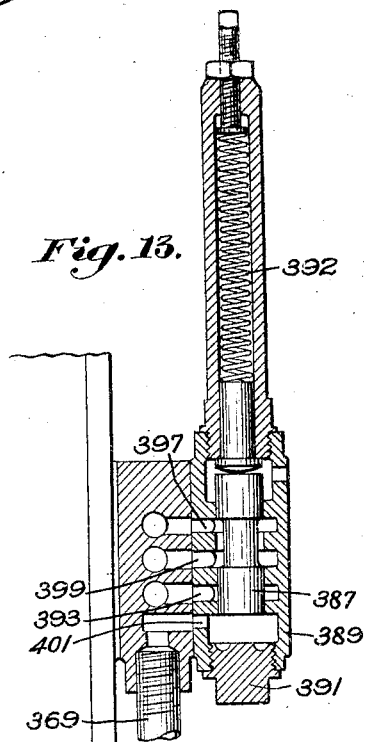

A. E. NORRIS.
HOISTING APPARATUS.
APPLICATION FILED JAN. 3, 1916.

1,419,167.

Patented June 13, 1922.
10 SHEETS—SHEET 9.

Inventor:
Almon E. Norris
by [signature]
Att'ys

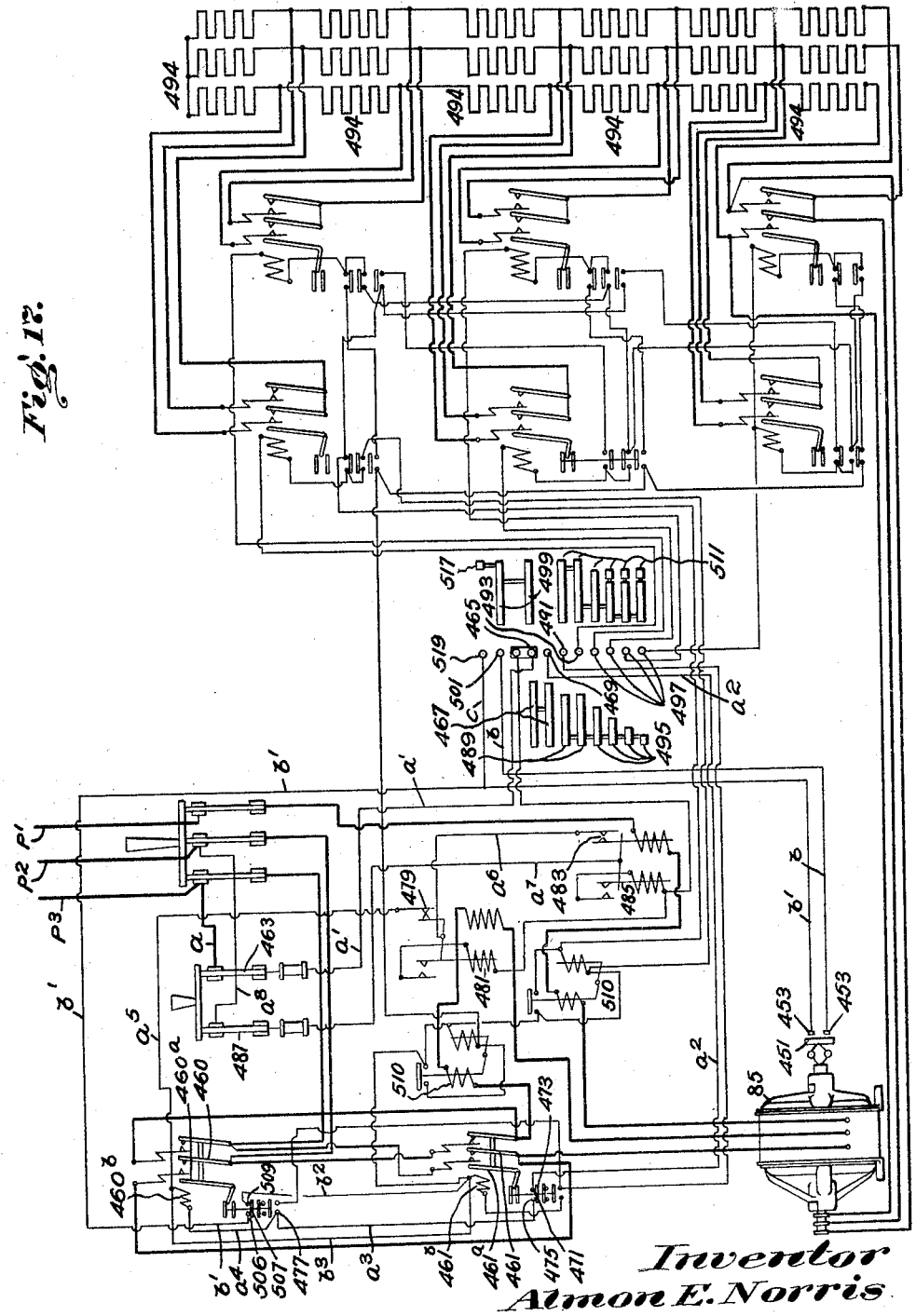

UNITED STATES PATENT OFFICE.

ALMON E. NORRIS, OF BROOKLINE, MASSACHUSETTS.

HOISTING APPARATUS.

1,419,167.  Specification of Letters Patent.  Patented June 13, 1922.

Application filed January 3, 1916. Serial No. 69,879.

*To all whom it may concern:*

Be it known that I, ALMON E. NORRIS, a citizen of the United States, residing at Brookline, in the county of Norfolk and State of Massachusetts, have invented an Improvement in Hoisting Apparatus, of which the following description, in connection with the accompanying drawings, is a specification, like characters on the drawings representing like parts.

This invention relates to improvements in hoisting and conveying apparatus and among other objects provides improved means for facilitating the control of such apparatus.
In the following description there is shown an embodiment of the invention as applied to the control of the trolley-supported bucket or grab as employed in connection with a self-propelled bridge, but the invention is applicable also to hoisting apparatus employed in connection with other structures and other forms of load carrying devices.

The invention will be best understood by reference to the following description of an illustrative embodiment thereof shown in the accompanying drawings, wherein:—

Fig. 1 is a side elevation showing the structure of a bridge selected for illustratration as embodying one form of the invention;

Fig. 2 is a view diagrammatic in form showing the arrangement of the operating ropes or cables for the grab and trolley;
Fig. 2ª on an enlarged scale in a section through the axis of the sheaves for the top head of the grab;

Fig. 3 is an end elevation of the drums and devices cooperating therewith for controlling the cables for the trolley and the grab;

Figure 4:
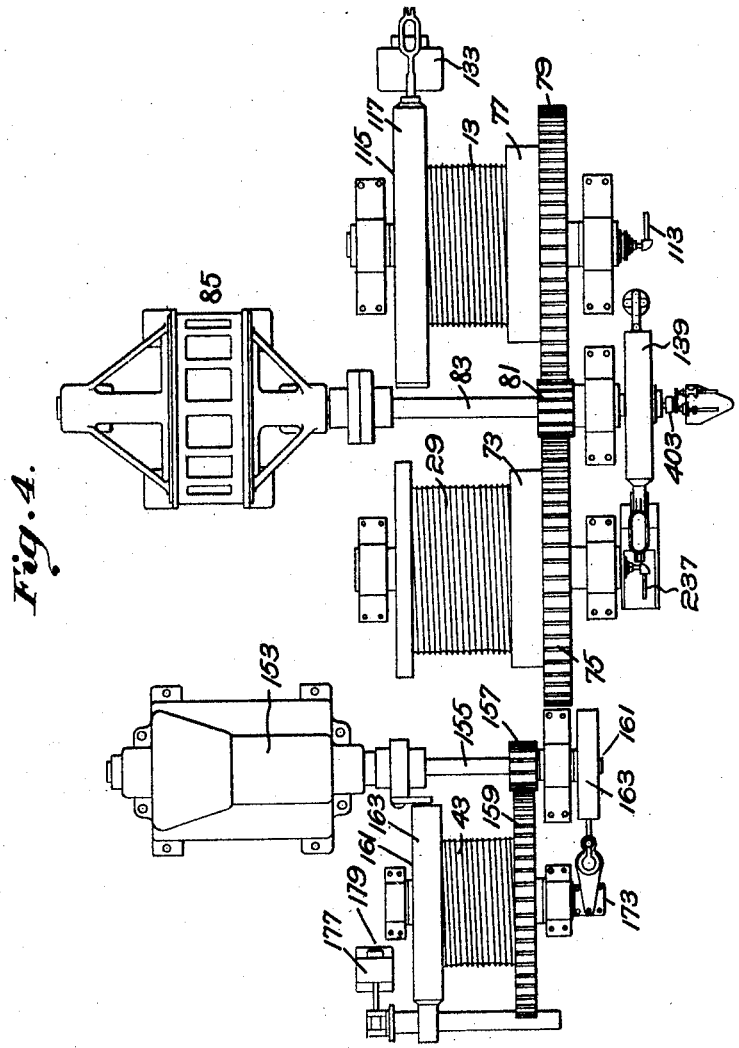

Fig. 4 on a smaller scale is a plan of the drums and devices associated therewith shown in Fig. 3;
Fig. 5 is a view diagrammatic in form showing the drums and devices appearing in Figs. 3 and 4, together with a controlling stand and an arrangement of fluid pressure conducting pipes leading therefrom to said devices;

Fig. 6 on an enlarged scale shows the controlling stand appearing in Fig. 5, the grab and transverse-controlling levers and devices operated thereby;
Fig. 7 is a vertical, transverse section taken on line 7—7 of Fig. 6;

Fig. 8 is a vertical, transverse section taken on line 8—8 of Fig. 6;

Fig. 9 is a side elevation of an interlocking valve and pressure fluid conducting pipes associated therewith;

Fig. 10 on an enlarged scale is a vertical section through the closing drum friction clutch applying valve and the connections therefrom to the controlling handle therefor;

Fig. 11 is a vertical section through the holding drum friction clutch applying valve and the connections therefrom to the controlling handle therefor;

Figure 15:
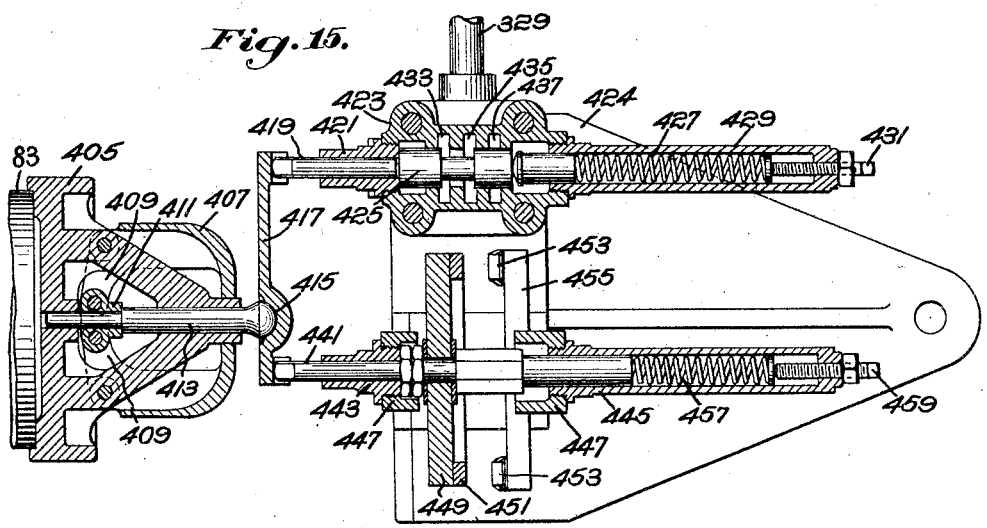

Fig. 12 is a vertical section through the traverse motor brake applying valve and connections therefrom leading to the controlling handle therefor;

Fig. 13 is a vertical section through the interlock valve between the holding drum friction clutch applying cylinder, and the automatic brake releasing cylinders for the holding drum and hoist motor shaft;

Fig. 14 on an enlarged scale is a horizontal section through the governor-controlled brake valve and the switch for throwing into operation the regenerative braking;

Fig. 15 is a view similar to Fig. 14 showing the parts in a different position;

Figure 16:
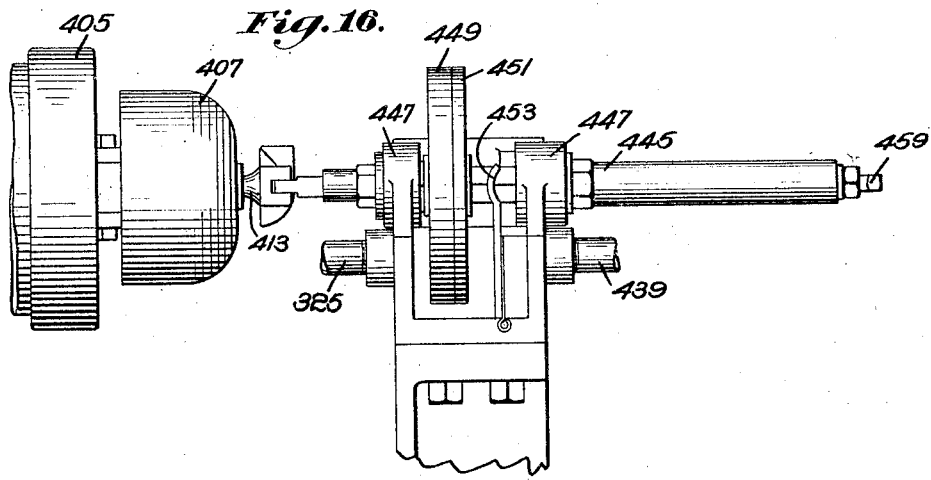

Fig. 16 is a side elevation of the governor and devices associated therewith shown in Figs. 14 and 15; and Fig. 17 is a wiring diagram showing the electrical connections for the primary and secondary panels of the master controller for the hoisting motor, and the electrical connections between the governor and said controller.

Referring to the drawings, the illustrative hoisting apparatus shown therein as embodying the invention comprises a hoisting and conveying bridge structure (Fig. 1) which supports an overhead trackway 1, one end of which is sustained by a boom 3. A trolley carriage 5 is adapted to run on said trackway and support a grab or bucket 7 of the well known clam shell type.

Referring to Fig. 2, the bucket as shown is provided with a holding or hoisting cable 9, and also an opening and closing cable 11, the latter for opening and closing its jaws. The holding cable is connected to be wound about or unwound from the holding drum 13, from whence it extends to the guide sheaves 15 and 17 and the guide sheave 19 at one end of the trackway. From the sheave 19 it extends back to a guide sheave 21 upon the trolley carriage 5, thence down toward the bucket, to and around a guide sheave 23, and up to a second guide sheave 25 upon the trolley carriage from whence it extends to a fixed anchor 27 at the opposite end of the trackway.

The opening and closing rope likewise is connected to the opening and closing drum 29, whence it extends over the guide sheaves 31 and 33 to the sheave 35 at one end of the trackway, thence to the sheave 37 upon the trolley and thence down and up around a series of guide sheaves at the bucket, up to another guide sheave 39 on the trolley and thence to the fixed anchor 27 at the opposite end of the trackway.

To traverse the trolley it is provided with an endless trolley rope 41 which is wrapped for a sufficient number of turns about the trolley-winding drum 43. From said winding drum it passes upward to the guide sheaves 45 and 47, whereat the two branches separate extending over guide sheaves 49, 51 and 53, thence to suitable guide sheaves 55 and 57 at opposite ends of the trackway, and thence to the trolley carriage 5 to which its ends are fixedly secured.

Means are preferably provided whereby the load will be applied unequally to the opening and closing and the hoisting cables. This unequal distribution may be desired for various reasons, for any of which this invention is applicable. Herein it is proposed to operate the bucket in such a way that substantially one-third of the weight of the loaded bucket when it is hoisted and transported by the trolley will be sustained by the opening and closing cable, and two-thirds of the weight will be sustained by the holding cable substantially as described in United States Letters Patent No. 992,799, granted to me May 23, 1911. Referring to Figs. 2 and 2ª, 59 designates the pivot pin for the bucket head, and 61 designates a pivot pin for the bucket jaws. With the distribution of the weight referred to, two-thirds of the bucket weight is taken by the sheave 23 referred to on the pin 59, under which sheave as stated passes the holding cable 9. The jaw pin 61 is provided with three sheaves, 63, 65 and 67. The opening and closing cable 11 passes about two sheaves 69 and 71 journaled on sleeve hubs 72 of the sheave 23. Each run of said cable, therefore, between the sheaves at the head and those at the jaws sustains one-sixth of the bucket weight. The two portions of the cable which pass over each of the sheaves 69 and 71 sustain one-third of the weight, and as a consequence there will be a downward pull on each of the sheaves 69 and 71 in the head equal to one-third of the weight, and an upward pull on the central sheave 23 equal approximately to two-thirds of the weight. The downward pull on the outside sheaves, therefore, will counter-balance the upward pull on the central sheave and as a result a relatively slight strain will come on the pivot pin 59.

By causing the holding cable to assume a greater part of the load, the wear upon the same due to contact with the one central sheave 23, may be made approximately the same as the wear upon the opening and closing cable due to contact of the five sheaves.

The opening and closing drum 29 is adapted to be connected by a clutch 73 (Figs. 3 and 4) with a gear 75, and the holding drum 13 is adapted to be connected by a clutch 77 with a gear 79, said gears 75 and 79 being in mesh with and adapted to be driven by an intermediate pinion 81 fast on a shaft 83 driven by an electric motor 85. The gears 75 and 79 are of the same size and are rotatable independently of the drum but are adapted to be connected to and disconnected from the same by said clutches 73 and 77 as more fully hereinafter described. Each of these clutches comprises a band 87 (Fig. 3) adapted to embrace a circumferential flange 89 fast to the drum. One end of said band is anchored to the gear at 91 and its other end is connected to an arm fast on a stud shaft 93 journaled in a boss projecting from said gear. To loosen the clutch band 87, an arm 95 is provided fast on said stud shaft and connected by a spring 97 with a shoulder on the hub 101 of said gear.

To apply the clutch, an arm 103 is provided having one end fast to the stud shaft and its opposite end pivotally connected to a stem 105 of a piston in a cylinder 109 carried by the gear. The end of said cylinder may be connected by a pipe 111 with a duct in the hub 101 communicating in turn with an elbow 113 leading to a source of pressure fluid as more fully hereinafter described. When pressure fluid is admitted to said cylinder through said pipe, the piston is advanced in the cylinder, thereby rocking the arm 103 in a contra-clockwise direction and causing the band 87 to grip the drum flange 89.

It will therefore be seen that the clutches 73, 77 for the opening and closing and holding the drum are maintained applied by the application of fluid pressure under the control of the operator, but in the absence of such application either clutch is released through the action of its releasing spring.

To hold the bucket, the holding drum 13 may be provided with means which automatically prevents the unwinding movement of the drum except when desired by the operator, such means being herein comprehended in the form of a brake which automatically prevents unwinding movement of the drum except when released, while permitting at all times the winding-on movement of the drum. As shown herein, the drum 13 has a large brake wheel 115 (Figs. 3 and 4) fixed thereto at its end opposite the clutch 77, said wheel being encircled by a brake band 117 connected to a brake lever 119 and a link 121 of a general construction similar to that disclosed in Letters Patent No. 1,123,786 granted to me January 5, 1915.

When the drum tends to unwind the cable by turning in a contra-clockwise direction (Fig. 3), the link which is normally positioned by a spring 123 is drawn out by reason of the friction on the band. This enforced movement of the link automatically closes and applies the brake irrespective of a releasing movement of the brake lever 119. Rotation of the drum 13 in the opposite direction draws the link down toward the center line passing from the axis of the hub to the point of pivotal support of the link, thereby automatically opening or unclasping the band and leaving the drum at all times free for rotation in that direction.

Also the brake may be positively released for movement in a contra-clockwise direction (Fig. 3) by a releasing movement of the lever 119. To accomplish this, said lever may be connected by a link 127 with one arm of a bell crank 129, the other arm whereof is pivotally connected to the stem 131 of a piston in a cylinder 133 having a pipe 135 connected thereto for conducting pressure fluid to the cylinder from a pressure fluid supply, as more fully hereinafter described. The admission of pressure fluid to the cylinder is under the control of the operator so that while the brake normally prevents reverse or unwinding movement of the holding drum and at all times permits the winding movement thereof, it may be released at will to permit the lowering of the grab.

To assist in stopping the holding drum motor and to prevent reversal of the motor shaft, a brake may be applied to the motor shaft 83 which is geared to said drum. This brake comprises a wheel 137 encircled by a brake band 139 connected to a brake lever 141 by a link 143 constructed and operating in a manner similar to that described for the holding drum brake. To positively release the brake, there may be provided a releasing lever 145 connected by a stem 147 with a piston in a cylinder 149 connected by a pipe 151 with a source of pressure fluid, as more fully hereinafter described.

The trolley-winding drum 43 (Figs. 3 and 4) is connected to be driven by the trolley motor 153 having a shaft 155 with a pinion 157 fast thereon meshing with a gear 159 secured to said drum.

To provide suitable means for braking the trolley, the motor shaft and drum shaft may be each equipped with a brake wheel 161 encircled by a brake band 163 having its ends pivotally connected to a lever 167 fulcrumed on a bracket 165. The brake is double acting and is normally held released by a spring 169 and may be applied at times desired by means of a piston rod 171 having one end connected to said lever 167 and its opposite end connected to a piston in a cylinder 173 having a pipe 175 leading therefrom adapted to be connected to a source of pressure fluid supply, as more fully hereinafter described.

The other brake for the trolley drum is similarly controlled by a piston in a cylinder 177 also connected by a pipe 179 with the pressure fluid supply.

Having described the grab, the trolley, the opening and closing drum, the holding drum, and the motors, clutches and brakes cooperating therewith, next will be described the controlling devices therefor.

Referring to Figs. 5 and 6, a controller stand and an arrangement of controlling levers thereon for the trolley and the grab are there shown. These levers include a lever 181 for controlling the starting, stopping and reversing of the trolley motor, and for controlling the traversing motor brakes; a hand grip lever 183 associated with the lever 181 for controlling the opening and closing drum clutch; a lever 185 for controlling the starting and stopping of the holding drum motor and for controlling the brake for said motor; and a hand grip lever 187 associated with said lever 185 for controlling the holding drum clutch. It will be observed all of these levers are closely assembled where they may be conveniently grasped and controlled by one operator.

Referring now more particularly to the controlling lever 181 for the trolley, its lower end may terminate in a boss 189 (Fig. 10) mounted fast on a sleeve 191 journaled in a bearing in a bracket 192 on said stand. Also fast on said sleeve is a toothed segment 193 (Figs. 8 and 10) meshing with a gear 195 fast on the shaft of a master controller 197 shown herein conventionally only, as it may consist of any usual or well known form of controller capable of starting the traverse motor when the lever 181 is moved in one direction, reversing the same when moved in the opposite direction and stopping the same when brought back to its normal or initial position. The controller will be provided with speed varying and other elements of control as are usual in this class of apparatus so that on moving the master controller in one direction or the other, the trolley motor will be automatically regulated as to resistance cut in or out of its circuit and its acceleration automatically controlled.

In order to control the trolley brakes simultaneously with the motor so that the brakes will always be applied when the motors are at rest, but released when the motors are energized, the lower end of the trolley lever 181 (Figs. 6 and 8) has attached thereto a cam segment 199 which controls the pressure cylinder valve for the brake cylinders 173 and 177 referred to. This valve may be similar to that disclosed in United States Letters Patent No. 1,088,293, granted to me February 24, 1914, and is of such construction that pressure of any required amount may be admitted to the cylinders to relax the brake bands to any desired extent, so that the degree of relaxation and the freedom of the trolley from the restraint of the brakes may be made directly dependent upon the position of the controlling lever.

Referring to Fig. 12, the traverse brake-controlling valve 201 is shown therein in the form of a two spool piston valve working within the casing 203. The latter is provided with an exhaust port 205 connected by a pipe 208 with the atmosphere and an admission port 207 connected by a pipe 209 with a pipe 211 (Fig. 6) connected in turn by a pipe 213 with a pressure fluid tank 215 (Fig. 5).

The casing 203 is also provided with a port 217 connected by a pipe 219 (Figs. 5 and 6) with branch pipes, one 221 leading to the brake cylinder 173, and the other 223 leading to the brake cylinder 177.

The duct 217 leading to the brake cylinders is also connected by a run-around passage 225 (indicated by dotted lines in Fig. 12) with an auxiliary port 227 opening into the rear end of the valve chamber. At its rear end the valve is opposed by a fixed abutment 229 having a stud receiving an abutment spring 231 engaging the rear end of the piston. The opposite end of the piston is engaged by an actuating plunger rod 233 having its upper end entering one end of a sleeve 235 tapped into the slide member 237 adapted to reciprocate between sets of guide rollers 238 carried by brackets 239 projecting from the controller stand. The plunger rod 233 is normally urged toward said piston by a spring 241 confined between the outer end of said sleeve 235 and a flange 243 on said rod. The upper end of the slide member is provided with a bar 245 (Fig. 12) urged upward by a spring 247 confined between an end of a bore in said bar and a stop member 249 adapted to engage the lower bracket 239. The upper end of said bar carries a roller 251 engaging the edge of the cam 199.

When the trolley lever 181 is in its mid position as shown in Fig. 8, cutting off the current from the motor 5, the roller 251 lies against the lowest point of the cam (as viewed in Fig. 8), thereby shifting the brake valve 201 downward and permitting the brake cylinders to communicate with the supply pipe to apply the brakes. As soon as the lever is moved, however, to start the trolley motor forward or backward, the roller 251 engages one or another of the depressions at the opposite sides of the point of the cam, thereby permitting the valve 201 to move upward and bring the brake cylinders into communication with the exhaust, to release the brakes.

The rear end of the valve is exposed to an end pressure proportional to the pressure admitted to the port 217. Such pressure, therefore, tends to move the valve back and as soon as pressure at the end of the valve exceeds the pressure of the spring 241, the valve will move into its normal position as shown in Fig. 12. The strength of the spring and the area of the valve are so selected that the valve will respond delicately to the pressure of the control lever and admit and maintain a pressure supply to the cylinder pipe which bears a definite relation to the position of the lever. Such pressure will be proportionate to the pressure exerted against the spring 241 and the operator will press down against the same through the connections described with a force at all times substantially proportionate to, although it may be considerably less than, the real pressure in the brake-operating cylinder. In other words, this control over the brake band is under conditions which simulate those where the band is connected by mechanical connections to the lever. If the pressure in the brake-operating cylinder tends to rise above or below a point predetermined by the position of the controlling lever 181, the opposing force of the pressure at one end of the valve and the compressed spring at the other will act to regulate the position of the valve and correct any departure from the designed pressure.

As the controller lever 181, therefore, is moved from its neutral position, the brake is slightly relaxed, the extent of relaxation increasing as the lever reaches a more advanced position. Finally, when the lever is thrown to bring the roller 251 on the part of the cam 199 having the shortest radius, the brake is wholly released and power is applied to the trolley motor.

Referring now to the hand grip lever 183 for controlling the clutch 73 for the opening and closing drum, said lever is associated with the trolley lever 181, so that the operator is enabled to maintain control over the trolley lever and the clutch lever with a single hand, the control of the one, however, in no wise interfering with the control of the other. The clutch lever 183 may be pivoted on the lever 181 at 253 (Figs. 8 and 10) and be connected by a link 255 with a slide block 257 pivotally connected in turn to one arm of a bell crank 259 pivotally connected to the trolley lever 181. The other arm of said bell crank is jointed to a slide rod 261 which passes axially through the controller sleeve shaft 191 referred to. The rod 261 may be tapped into one end of a slide member 263 adapted to reciprocate in a bracket 264 mounted on the controller stand and be held in different positions of adjustment by a lock nut 265. A sleeve 267 may be tapped into the opposite end of said slide member and be held in different positions of adjustment by a lock nut 269. A plunger rod 271 has an end adapted to slide in the sleeve 267 and its opposite end is adapted to engage a valve 273 working within the casing 275. This casing is provided with an exhaust port 277 connected to the atmosphere by a pipe 279 and is provided with an admission port 281 connected by a pipe 283 with the pressure fluid supply pipe 211 (Fig. 6) referred to. An intermediate port 285 is connected by a pipe 287 (Figs. 5 and 6) with the cylinder for controlling the opening and closing drum clutch.

The plunger rod 271 referred to is provided with a spring 289 (Fig. 10) confined between a flange 291 on said rod and the outer end of the sleeve 267. This spring is constructed and adjusted to normally cause the valve 273 to admit sufficient pressure from the supply pipe 283 to the opening and closing drum clutch cylinder to apply the clutch and thereby connect the drum with its driving motor.

When it is desired to release the clutch the hand grip lever 183 is squeezed toward the lever 181, thereby rocking the bell crank 259 in a contra-clockwise direction (Fig. 10) and causing the rod 261 and sliding member 263 to slide axially somewhat toward the right of Fig. 10. This will serve to relax the tension on the spring 281 and permit the valve to shift and open the opening and closing drum clutch to the exhaust, thereby releasing said clutch and disconnecting the drum from its motor. A run-around port 293 (Fig. 10) connects the port 285 leading to the clutch with the rear end of the valve chamber and permits the same desirable nicety of control for the opening and closing drum clutch as is had by the valve 201 described for the controlling of the trolley brake, and therefore does not need to be described in detail here.

Referring now to the holding drum control. The lever 185 referred to, has a boss 295 (Fig. 11) fast on a sleeve 297 journaled in a bearing in a bracket 299 on the control stand. A toothed segment 301 (Figs. 7 and 11) is also mounted fast on said sleeve and meshes with a gear 303 on the shaft of a master controller 305 (Fig. 6) for controlling the starting and stopping of the hoisting drum motor.

To control the automatic brake for the holding drum, there is provided a valve working within a casing 307 (Figs. 6 and 7) said valve being of the same construction as the trolley brake valve 201 already described, and its detailed construction, therefore, need not be repeated. The valve is provided with a spring-pressed plunger rod 309 and a slide member 311 having at the upper end thereof a roller 313 engaging the sector cam 315 secured to the hoist lever 185.

The holding drum automatic brake valve casing 307 is connected to an exhaust pipe 317 and is connected by a pipe 319 (Fig. 6) with a pipe 321 connected in turn to the pressure fluid supply pipe 213 referred to. The casing is also connected by a pipe 323 with the casing 389 of an interlocking valve to be described, the latter being connected by a pipe 325 with the casing of a governor controlled valve 425 to be referred to, said casing being connected in turn by a pipe 329 (Fig. 5) with branch pipes 331 and 333, leading respectively to the pipe 151 at the motor shaft automatic brake releasing cylinder, and to the pipe 135 at the holding drum brake releasing cylinder.

The hoist lever is thrown to the right (Fig. 7) to hoist the bucket, and in the opposite direction to lower the same. The cam 315 is, therefore, so formed as to be ineffective in the hoist position of the lever, but has a raised portion which depresses the plunger 309 to release the holding drum brake when the lever is moved in the opposite direction for lowering. The cam is so formed that it becomes effective to admit pressure to the brake cylinder in a gradually increasing amount gradually to bring the brakes to a full release.

Next will be described mechanism cooperating with the hand grip lever 187 referred to for controlling the holding drum clutch. This lever is connected by a link 335 (Figs. 7 and 11) with a sliding block 337 connected in turn to a bell crank 339 pivotally mounted on the hand lever 185 and jointed to a rod 341 extending axially through the controller sleeve shaft 297 referred to. Said rod is tapped into one end of a sliding member 343 mounted in a bracket 345 on the controller stand. The rod may be adjusted relatively to said member and be held in different positions of adjustment by a lock nut 347. A sleeve 349 is tapped into the opposite end of said slide member and is adjustably held by a lock nut 351. A plunger rod 353 has one end adapted to slide in said sleeve and its opposite end adapted to engage a valve 355 mounted in a casing 357 and control the holding drum clutch cylinder.

The valve casing is provided with an exhaust port 359 communicating with an exhaust pipe 361 and with an admission port 363 communicating with a pipe 365 connected to the pipe 321 leading from the pressure fluid supply pipe 213. The valve casing has an intermediate port 367 communicating with the pipe 369 (Fig. 6) leading to the interlock valve referred to. Said port 367 also communicates with a pipe 371 leading to the pipe 113 referred to communicating with the holding drum clutch-controlling cylinder 109.

The holding drum clutch valve 355 is normally held to the right (Fig. 11) by a spring 373 encircling the plunger rod 353 and confined between a flange 375 thereon and the outer end of the sleeve 349. When it is desired to release the hoist drum clutch, the hand grip lever 187 is squeezed toward the hoist lever 185, thereby rocking the bell crank 339 in a clockwise direction (Fig. 11) and shifting the slide member 343 to the left of said figure thereby relaxing the tension of the spring 373 and permitting the valve 355 to shift to the left and cut off the hoist drum clutch cylinder from the source of pressure fluid supply and open said cylinder to the exhaust pipe.

The spring 289 for the valve for the opening and closing drum clutch and the spring 373 for the valve for the hoist drum clutch may be constructed and adjusted to have an equal tension and both tend to move their valves with equal force and thereby admit equal pressures applying the clutch for the opening and closing drum and the clutch for the holding drum. The rods 261 and 341 may be connected by an interlocking rod 377 (Fig. 6) bridging the space between the traverse and the hoist-controlling levers 183 and 187. With the springs 289 and 373 acting with equal force, the rods 261 and 341 would be held in an intermediate position and the same pressure would then be applied to the opening and closing and holding drum clutches. It is not necessary, however, to employ as much pressure to apply the opening and closing drum clutch as to apply the holding drum clutch. This is due to the fact that as stated the opening and closing cable sustains one-third of the weight of the bucket, while the holding cable sustains two-thirds of the weight of the bucket.

An important feature of the invention relates to means whereby the pressure may be distributed to the two clutches in any proportion required, thereby eliminating the necessity for the full pressure on both clutches and resulting in an economy of fluid consumption. To accomplish this, means is provided typified herein in the form of a spring 379 (Figs. 6 and 11) encircling the rod 341 and having one end engaging a washer 381 bearing against an end of the sleeve 297 referred to. The opposite end of said spring engages a nut 383 threaded on the rod 341 and held in different positions of adjustment by a lock nut 385. By adjusting these nuts axially of said rod, the spring 379 may be given any appropriate tension for out-balancing the effect of the springs 289 and 373 to any extent required. For example, if there is a fluid pressure of sixty pounds in the supply pipes leading to the valves for controlling the opening and closing and holding drum clutches, the spring 379 may be adjusted so that the holding drum valve 355 will be opened sufficiently to permit forty pounds pressure to be applied to the holding drum clutch while the opening and closing valve 273 is open merely sufficiently to admit twenty pounds pressure to the opening and closing drum clutch. This apportioning of the pressures will be automatically maintained since there is an end pressure on the ends of the valves proportional to the pressure admitted to the clutch cylinders operating in a manner as has already been explained. This apportioning of the pressures will maintain so long as the hand grip levers 183 and 187 for controlling the valves for the opening and closing and holding drum clutches are relaxed. When it is desired to open the jaws of the bucket the hand grip lever 183 is squeezed toward the lever 181 thereby shifting the rod 261 to the right (Figs. 6 and 10) and permitting the valve 273 to move to the right and connect the opening and closing drum clutch with the exhaust. When the rod 261 is shifted to the right it also opens the holding valve 355 to the fluid pressure supply, and the pressure previously employed in closing the opening and closing drum clutch may be available to and be used by the holding drum clutch. As stated, when the jaws of the bucket were closed, one-third of the weight thereof was sustained by the opening and closing cable and two-thirds of the weight thereof was sustained by the holding cable. Now, therefore, the total weight of the bucket being on the holding cable, the total pressure is diverted to the clutch for the drum connected to said cable.

After the jaws of the grab have been opened to discharge its contents the hand grip lever 183 is relaxed to apply the opening and closing drum clutch. Since the holding drum clutch is already applied both drums are connected with the motor. Hence when the brakes are released to permit the lowering of the grab, the cables connecting the latter with said drums will reversely rotate said motor.

To close the jaws of the bucket to take its load in readiness for hoisting, the hand grip lever 187 is squeezed toward its lever 185, thereby shifting the valves 273 and 355 to the left (Figs. 6, 10 and 11), thereby diverting the pressure from the holding drum clutch to the opening and closing drum clutch. This will connect the opening and closing drum with its motor and cause the winding of the cable thereon and the closing of the jaws of the bucket. When the jaws are closed, the hand grip 187 is relaxed and the springs on the rods 261 and 341 will then become automatically effective to position the valves to distribute, for example, forty pounds of pressure to the holding drum clutch and twenty pounds pressure to the opening and closing drum clutch.

In order that the holding drum may be at all times either held by its brake or operatively related to its motor through its clutch, and thus to avoid the simultaneous release of said brake and clutch and the possibility of the operator's dropping the bucket by an accidental or ill-timed movement of the control levers, the outlet pipe 323 leading from the brake valve 307 does not lead directly to the brake cylinders but passes first to the interlock device referred to. This device comprises a valve 387 working in a casing 389 (Figs. 6 and 13) and adapted to prevent the release of the holding drum brake and its motor brake simultaneously with the release of the clutch for the holding drum.

The valve 387 is normally pressed against the buffer or stop 391 (Fig. 13) by the adjustable spring 392. The valve casing is provided with a port 393 communicating with an exhaust pipe 395 (Fig. 6) and is provided with a port 397 connected to the pipe 323 leading from the holding brake controlling valve 307. The casing is also provided with a port 399 connected to the pipe 325 leading to the brake-controlling cylinders. The casing is also provided with a port 401 communicating with the pipe 369 leading from the holding clutch controlling valve.

The spring 392 tends to hold the valve 387 downward against the fixed buffer 391, thereby placing the pipe 325 leading to the brake cylinders in communication with the exhaust. Normally, however, pressure is maintained in the holding clutch-controlling cylinder to apply said clutch. Therefore when the valve 355 is in position to connect the holding drum clutch cylinder with the pressure supply, it also admits pressure to the lower end of the valve 387 through the pipe 369. This pressure shifts said valve upward against the resistance of the spring 392 and therefore normally holds said valve in position to admit pressure from the holding drum brake valve 307 through the pipe 323 to the pipe 325 leading to the brakes of the holding drum and its motor. So long, therefore, as the interlock valve 387 is maintained in its upward position, the brake-controlling valve 307 will be effective to release the brakes. When, however, the holding drum clutch valve is shifted to release the holding drum clutch, the pressure on the lower end of the interlock valve is released, thereby permitting the latter to drop and place the pipe 325 leading to the brakes in communication with the exhaust. This will permit the springs of said brakes to apply the same. Thus on the release of the clutch the automatic application of the brakes is assured and the holding drum will be always held either by the brakes or be operatively related to its motor through the holding drum clutch. The interlock valve in its broad aspect may be similar to that disclosed in my co-pending application Serial No. 648,278 filed September 8, 1911.

Since there is no escape for the pressure applied to the lower end of the interlock valve 387 excepting back through the pipe 369 to the holding clutch valve 355, it follows that when the latter valve is shifted to the left (Fig. 11) to cut off the pipe 369 from the pressure fluid supply, pressure fluid will be pocketed at the lower end of the valve 387 and maintain the same in the position shown in Fig. 13. When the holding clutch valve 355 is shifted further to the left (Fig. 11) it will place the pipe 369 in communication with the exhaust pipe 361, thereby releasing the pressure at the rear end of the interlock valve 387 and permitting its spring 392 to place the pipe 325 leading to the brakes in communication with the exhaust pipe 395.

An important feature of the invention relates to the checking of the fall of the grab by regenerative braking.

When the control lever 185 is shifted to release the brakes and permit the lowering of the grab, the unwinding of the cables from the holding and opening and closing drums reverses their motor, and when the latter attains synchronous speed its circuit is automatically closed and the motor is operated regeneratively, thereby returning power to the line from which it receives its current. The work of this regeneration serves to check or limit the speed of fall of the grab and to maintain a substantially constant lowering speed therefor. To produce this regeneration, the holding motor may be provided with a governor 403 (Figs. 4, 14, 15 and 16) comprising a head 405 fixed to the outer end of the holding motor shaft 83 referred to, and having segments 407 pivoted thereto. These segments have inwardly projecting arms 409 pivoted to a ring 411 fast on a spindle 413 adapted to slide in a projection on said head. The spindle has a rounded end seated in a similarly shaped depression 415 in a bar 417. One end of said bar is suitably connected to one end of a rod 419, the opposite end of which is adapted to slide in a plug 421 of a valve casing 423 mounted on a bracket 424 on a standard adjacent to the holding motor shaft 83. This casing contains a valve 425 normally urged against said plug by a helical spring 427 in a casing 429 tapped into one end of the valve casing. The tension of said spring may be varied by an adjusting screw 431.

The valve casing is provided with a port 433 connected to the pipe 325 referred to for conducting pressure fluid from the interlock valve. The valve casing is also provided with a port 435 communicating with the pipe 329 referred to leading to the pipes 331 and 333 which are connected to the controlling cylinders for the brakes for the holding drum and its motor. The valve casing is also provided with a port 437 communicating with an exhaust pipe 439.

The spindle bar 417 is also connected to one end of a plunger 441 adapted to slide in a plug 443 and a spring casing 445 on upright members 447 rising from the bracket 424 referred to. A disc 449 of insulation material is mounted fast on said plunger intermediate its ends and carries a contact ring 451 adapted for engagement with contact fingers 453 mounted on an insulation bar 455 secured to one of the upright members 447. The plunger 441 is normally urged toward the governor by a spring 457 contained in the casing 445, the tension of which may be varied by an adjusting screw 459.

When the hoisting motor shaft is rotated by the unwinding of the drums, the governor segments 407 will tend to fly outward by centrifugal force from their position shown in Fig. 15 to their position shown in Fig. 14. This will cause the spindle 413 to slide outward and press the bar 417 on the valve spindle 419 and contact plunger 441 against the resistance of their springs. The spindle is connected with the bar at one side of the center of the bar so that it operates with greater mechanical advantage on the contact plunger than on the valve spindle. Consequently, the governor spindle in moving outward will first thrust the contact ring 451 into engagement with the contact fingers 453, and may under certain conditions then shift the brake-controlling valve 425 toward the right of Figs. 14 and 15 to apply the holding drum and motor shaft brakes. The connecting of the contact ring with the contact fingers completes a circuit to be described for the holding drum motor.

As soon as the motor speed is above synchronous speed the regenerative braking obtained by the motor will be effective to sufficiently limit the speed of fall of the grab and the spindle bar 417 will remain in its position shown in Fig. 14, holding the contact ring 451 against the finger contacts 453 and completing the circuit to said motor. If, however, the regenerative braking should fail to sufficiently limit the fall of the grab, the speed of the hoisting motor will increase, thereby increasing the speed of rotation of the governor and causing the segments 407 of the latter to fly further outward. This will thrust the spindle bar 417 from its position shown in full lines in Fig. 14 to its position shown in dotted lines in said figure, thereby shifting the valve 425 to the right (Figs. 14 and 15) and placing the pipe 329 leading to the automatic brakes of the holding drum and its motor shaft into communication with the exhaust pipe 439. This will permit the springs of said brakes to become effective to apply the same and retard the fall of and bring the grab to rest.

It will be understood that the governor-controlled valve is normally in the position shown in Figs. 14 and 15, thereby placing the pipe 329 leading to the brake-controlling cylinders of the holding drum and its motor in communication with the pipe 325 leading from the interlock valve.

The master speed controller for the alternating current motor for the holding drum may be in its broad aspect of usual construction and therefore need not be described in detail herein excepting in so far as it may be necessary to explain the electrical connections of the governor-controlled switch therewith.

Referring to Fig. 17, there is shown a development of the master controller cylinder contacts together with stationary contacts cooperating therewith.

$P'$, $P^2$, $P^3$ designate the three-phase primary conductors leading to the alternating current hoist motor 85. The conductor $P'$ leads directly to said motor, while the conductors $P^2$ and $P^3$ are interrupted by a switch 460 adapted to be closed to complete the primary circuit for forward driving of the motor to hoist the grab and by a switch 461 adapted to be closed to complete the primary circuit to the motor for reversing the same. To close the forward switch 460 it has an armature $460^a$ connected thereto adapted to be attracted by a magnetic coil $460^b$. To close the reverse switch 461, it has an armature $461^a$ connected thereto adapted to be attracted by a magnetic coil $461^b$.

The circuit for energizing the forward switch coil $460^b$ comprises a conductor $a$ tapped from the primary conductor $P^3$ and connected by a switch 463 with a conductor $a'$ leading to a stationary contact 465 as the master controller. This contact is adapted to be connected by a bridge contact 467 on the controller cylinder with a stationary contact 469. The latter is connected by a conductor $a^2$ with a fixed contact 471 at the reverse switch 461 and adapted to be connected by a bridge contact 473 with a fixed contact 475 by the reverse switch when the latter is open. The fixed contact 475 is connected by a conductor $a^3$ with a fixed contact 477 at the forward switch 460, said fixed contact 477 being connected by a conductor $a^4$ with the coil magnet $460^b$ for closing the forward switch. Said coil is connected by a conductor $a^5$ with a conductor $a^6$ through a switch 479 controlled by an overload coil 481. The conductor $a^6$ is connected to a conductor $a^7$ through a switch 483 controlled by an overload coil 485. These overload switches and coils are of usual construction and need not be further referred to herein. The conductor $a^7$ is connected by the switch 487 with the conductor $a^8$ leading to the primary conductor $P^2$.

From the above description it will be apparent that when the controller cylinder is shifted to the right the bridge contact 467 will connect the stationary contacts 465 and 469 and thereby complete the circuit just described to the coil magnet $460^b$. This will energize said coil and shift the forward switch 460 to the left (Fig. 17), thereby completing the circuit through the primary conductors $P^2$ and $P^3$ to the alternating current motor 85, and rotating the same in a direction for hoisting the grab.

As the controller cylinder is shifted further to the right, bridged contact segments 489 on the cylinder will connect a stationary contact 491 with a stationary contact 493 and thereby cut out some of the resistances 494 on the secondary panel. As the controller cylinder is shifted further to the right, contact segments 495 are progressively brought into engagement with stationary contacts 497, thereby progressively cutting out additional resistances and increasing the speed of the motor. Since these resistances and the circuits therefor are of usual construction, it is thought unnecessary to describe them further herein.

The circuit for energizing the reverse switch coil $461^b$ comprises a bridge contact 499 on the controller cylinder for connecting the stationary contact 465 referred to with a stationary contact 501. The latter is connected by a conductor $b$ with one of the finger contacts 453 which as stated is adapted to be connected by the governor actuated ring contact 451 with a finger contact 453. The latter contact is connected by a conductor $b'$ with a fixed contact 506 at the forward switch 460 and adapted to be connected by a bridge contact 507 with a fixed contact 509 by the forward switch when the latter is open. The fixed contact 509 is connected by a conductor $b^2$ with the reverse switch actuating coil $461^b$ referred to. This coil is connected by a conductor $b^3$ with the magnetic coil $460^b$ for the forward switch. As stated this coil is connected through the conductors $a^5$, $a^6$, $a^7$ and $a^8$ with the primary conductor $P^2$.

When the controller cylinder is shifted to the left (Fig. 17) the bridged contacts 499 will connect the stationary contacts 465 and 501 and the circuit will be completed for energizing the reverse switch magnetic coil $461^b$ with the exception at the point where the circuit is broken by the governor-controlled switch 451. When the motor is reversed by the drop of the grab and brought above synchronous speed, the governor will automatically close the switch 451 and complete the circuit to the reverse switch coil $461^b$, thereby causing the reverse switch 461 to complete the circuit through the primary conductors $P^2$ and $P^3$ to the motor. The regenerative braking will now commence.

The usual current limiting coils 510 and their circuits and switches may be provided and need not be referred to further herein.

When the cylinder is shifted to the left as described, a series of resistance segments 511 will be brought into engagement with the stationary contacts 491, 493 and 497, thereby cutting out all of the resistances 494 referred to.

As long as the speed of the motor is maintained above synchronism by the fall of the grab, it will continue to act with regenerative braking effect, but if for any reason the speed of the motor should increase beyond this point, as for example on failure of the current, then it will cease to act with regenerative braking effect and the governor will shift the valve 425 and permit the pressure fluid on the brakes to exhaust, thereby permitting the automatic brakes to apply to check the lowering of the grab and arrest the same.

It is desired at times to reverse the motor and enable a few reverse turns to be imparted to the winding drums to "kick off" the cables therefrom to initiate and accelerate the fall of the grab or to slacken the cables as desired. To accomplish this the controller cylinder is provided with a contact 517 adapted to be connected with a stationary contact 519 when the cylinder is shifted to the extreme left, said contact being connected by a conductor $c$ with the conductor $b'$ leading to the magnet coil $461^b$ for controlling the reverse switch 461. This will serve as a shunt across the conductors $b$ and $b'$ leading to the governor controlled switch and complete the circuit to the coil $461^b$ and close the reverse switch 461 independently of the governor controlled switch.

To illustrate the operation of the apparatus it may be assumed that the grab is in the hold of the vessel and the clutches for the opening and closing and holding drums are applied by the differential pressures described to connect them with their motor. To elevate the grab the hand lever 185 is rocked to start the motor and cause said drums to rotate and wind the opening and closing and holding cables thereon. When the grab has been elevated to the desired point the hand lever 185 is rocked to arrest said motor and drums. The brakes for said drums apply automatically as described to prevent reverse rotation thereof.

Next the hand lever 181 is rocked to release the trolley carriage brakes and to start the trolley motor and cause the carriage to travel in on its boom to convey the grab to the proper point for discharging its contents. Then the hand lever 181 is rocked to arrest the trolley motor and apply the trolley carriage brakes.

Then the hand grip 183 is squeezed toward the hand lever 181 to release the clutch for the opening and closing drum. Now the total pressure formerly used to apply both clutches, becomes available to apply the holding drum clutch which must bear the entire weight of the grab. The opening and closing drum, being disconnected from its motor and brake, will be free to rotate and unwind sufficient cable to permit the jaws of the grab to open and discharge. After the grab has discharged its contents, the hand grip lever 183 is relaxed to reapply the opening and closing drum clutch.

Next the hand lever 181 is operated to release the trolley carriage brakes and start the trolley carriage motor and cause said carriage to travel out on its beam to convey the grab to a point over the hold of the vessel. Then the hand lever 181 is operated to arrest the motor and apply the brakes to hold the carriage in this position.

Next the hand lever 185 is rocked to release the brakes for the holding drum and motor shaft. The grab will now commence to drop with its jaws open into the hold.

Both clutches for the drums are applied and therefore connect said drums with their motor. Consequently the fall of the grab will reversely rotate said motor. When the motor attains a speed slightly above synchronous, the governor driven thereby will automatically close the circuit to its said motor and the latter will operate regeneratively and serve as a brake to retard the fall of the grab. If the regenerative brake should fail to sufficiently limit the fall of the grab, the resulting increased speed of the motor-driven governor will automatically apply the brakes for the opening and closing and holding drums and bring the grab to rest.

With the open grab resting upon the material to be hoisted, the hand grip lever 187 is squeezed, thereby applying the full amount of fluid pressure to the clutch for the opening and closing drum and at the same time exhausting all pressure from the cylinder for the holding drum clutch and allowing the latter to disengage. At the same time the hand lever 185 is rocked to start the motor and wind in the opening and closing cable and close the jaws of the bucket. When the jaws are tightly closed the hand grip lever 187 is released which again applies the hoisting drum clutch and both ropes are then wound in together to elevate the grab, as heretofore described, with the fluid pressure apportioned between the clutch operating cylinders as already stated.

It will be understood that, while I have herein disclosed for illustrative purposes one specific embodiment of my invention, the same is not limited to the details of the form or construction, or relative arrangement of parts shown herein, but that extensive deviations may be made from the details hereinbefore described without departing from the spirit of the invention.

Having thus described my invention, what I claim is:—

1. A hoisting apparatus comprising in combination, an opening and closing cable and a holding cable for a grab, drums for said cables, motor means, clutches for connecting said drums with said motor means, and controlling means for said clutches including valves for controlling the application of pressure fluid to said clutches, and controlling means for said valves having interconnections for causing the valves automatically to maintain different pressures on said clutches.

2. A hoisting apparatus comprising in combination, an opening and closing cable and a holding cable for a grab, drums for said cables, motor means, clutches for connecting said drums with said motor means, controlling devices for said clutches and means interconnecting said controlling means for automatically applying a greater pressure to said holding drum clutch than to said opening and closing drum clutch.

3. A hoisting apparatus comprising in combination an opening and closing cable and a holding cable for the grab, drums for said cables, motor means, friction clutches for connecting said drums with said motor means, fluid pressure controlling means, and means interconnecting said fluid pressure controlling means for automatically applying a greater pressure on one clutch than on the other.

4. A hoisting apparatus comprising in combination, an opening and closing cable and a holding cable for a grab, drums for said cables, motor means, clutches for connecting said drums with said motor means, fluid pressure controlling means for said clutches, means interconnecting said fluid pressure controlling means for automatically applying a greater fluid pressure on one of said clutches than on the other, and means for varying the difference in the pressures.

5. A hoisting apparatus comprising, in combination, controlling instrumentalities for the grab including a plurality of rope-winding drums and friction clutches therefor, independent devices for applying the clutches and controlling means for said clutch-applying devices automatically maintaining different but predeterminately related pressures on said clutches.

6. A hoisting apparatus comprising in combination, controlling instrumentalities for a grab, including pressure fluid operated clutches, valves, and controlling means for said valves having provision for automatically apportioning different pressures to said clutches.

7. A hoisting apparatus comprising in combination, controlling means for a grab, including pressure fluid operated elements, valves therefor, and means for automatically adjusting said valves to apply a greater pressure to one of said elements than to the other.

8. A hoisting apparatus comprising in combination, controlling means for a grab, including pressure fluid operated elements, valves therefor, and means for automatically adjusting said valves to automatically apply and maintain greater pressures on one of said elements than on the other.

9. A hoisting apparatus comprising in combination, an opening and closing cable and a holding cable for a grab, drums for said cables, motor means, pressure fluid operated clutches for connecting said drums with said motor means, and means for controlling the application of the pressure fluid to said clutches, including valves, spring-pressed plungers acting on said valves, means connecting said plungers, and means for causing one of said plungers to act on its valve with greater force than the other.

10. A hoisting apparatus comprising in combination, an opening and closing cable and a holding cable for a grab, drums for said cables, motor means, pressure fluid operated clutches for connecting said drums with said motor means, and means for controlling the application of the pressure fluid to said clutches, including valves, plungers therefor, springs tending to thrust said plungers equally toward their valves, means connecting said plungers, and means tending to shift said means to press one of said springs more than the other.

11. A hoisting apparatus comprising in combination, an opening and closing cable and a holding cable for a grab, drums for said cables, motor means, pressure fluid operated clutches for connecting said drums with said motor means, and means for controlling the application of the pressure fluid to said clutches, including valves, plungers therefor, springs tending to thrust said plungers equally toward their valves, means connecting said plungers, and spring means tending to shift said means to press one of said springs more than the other.

12. A hoisting apparatus comprising in combination, an opening and closing cable and a holding cable for a grab, drums for said cables, motor means, pressure fluid operated clutches for connecting said drums with said motor means, and controlling means for said pressure fluid, including valves for said clutches and controlling means for said valves, including spring means tending to open one of said valves more than the other to apply one of said clutches with a pressure greater than the other.

13. A hoisting apparatus comprising in combination, an opening and closing cable and a holding cable for a grab, drums for said cables, motor means, pressure fluid operated clutches for connecting said drums with said motor means, controlling means for said pressure fluid, including valves for said clutches and controlling means for said valves, including spring means tending to open one of said valves more than the other to apply one of said clutches with a pressure greater than the other, and manually operated means for shifting said valves to release said clutches.

14. A hoisting apparatus comprising in combination, an opening and closing cable, a holding cable, drums for a grab, motor means, pressure fluid operated clutches for connecting said drums with said motor means, and means for controlling the application of the pressure fluid to said clutches, including valves, a spring tending to shift each valve, means effective in proportion to the pressure fluid admitted to said clutches for moving said valve in opposition to said springs, and means floating between said springs having provision for producing a greater tension in one than in the other.

15. A hoisting apparatus comprising in combination an opening and closing cable and a holding cable for the grab, said cables being connected to assume different proportions of the load, rope winding drums, friction clutches for said drums, pressure fluid means for applying the clutches, and means automatically to maintain different pressures on said clutches related each to the load assumed by its clutch.

16. A hoisting apparatus comprising, in combination, controlling instrumentalities for a load-carrying device including friction clutches, independent means for applying the clutches, means for manually controlling said clutch-applying means and means intermediate said manual means and said clutch-applying means for apportioning different pressures to said clutches.

17. A hoisting apparatus comprising in combination, controlling instrumentalities for the grab, including load sustaining cables therefor, friction clutches controlling said cables, and means for automatically maintaining a different pressure on one clutch from that on the other when said clutches are both engaged, and for automatically increasing the pressure on the engaged clutch or clutches when one of the clutches is released.

18. A hoisting apparatus comprising in combination, an opening and closing cable and a holding cable for the grab connected to sustain different proportions of the load, drums for said cables, friction clutches therefor, pressure fluid means for controlling said clutches and adapted to automatically maintain different pressures on said clutches related each to the load normally assumed by its cable, and means for automatically increasing the pressure on one of said clutches when the other clutch is disengaged.

19. A hoisting apparatus having hoisting instrumentalities, including a plurality of friction clutches for rope winding drums, means to release said clutches separately, and interconnections applying greater pressure to the engaged clutch when the remaining clutch is released.

20. A hoisting apparatus comprising in combination, a carrier, a winding drum, a cable connecting the same, a motor and its shaft for rotating said drum to hoist said carrier, an automatic brake for said winding drum, an automatic brake for said motor shaft, and controlling means having provision for simultaneously releasing said brakes.

21. A hoisting apparatus comprising, in combination, a load carrier, a winding drum, a motor to drive the drum to hoist the load carrier, a cable connecting the same, a brake normally applied to hold said winding drum against the lowering of the load carrier, brake-controlling means adapted to release said brake, and speed-responsive means responsive to the descent of the load, adapted to apply said brake to check the descent while leaving said controlling means in a position of brake release.

22. A hoisting apparatus comprising in combination a carrier, a winding drum, a cable connecting the same, a motor for rotating said drum to hoist the carrier, a brake for said drum, means for releasing said brake, and means independent of the brake-releasing means to apply the brake dependent on the speed of rotation of the drum.

23. A hoisting apparatus comprising in combination a carrier, a winding drum, a cable connecting the same, an automatic brake for said winding drum adapted to hold said drum against unwinding movement while permitting free winding movement thereof, controlling means for releasing the brake, and a speed governor adapted independently to apply the brake while leaving the controlling means in a position of brake release.

24. In a hoisting apparatus, the combination with a load carrying device, of a hoisting rope therefor, a rope winding drum for said rope, a driving motor, a clutch between the motor and the drum, a brake for the drum, a brake controller, a clutch controller for the separate control of the clutch, interlocking means to prevent the simultaneous release of both clutch and brake, and means independent of the brake controller to apply the brake on excess speed of said rope winding drum.

25. A hoisting apparatus comprising in combination, a carrier 7, an opening and closing cable 11 and a holding cable 9 therefor, drums 29 and 13 for said cables, a motor 85 for rotating said drums to hoist the carrier, clutches 73 and 77 for connecting said drums with said motor, and controlling means for said clutches including valves 273 and 363 and means for shifting said valves including springs 289, 373 and 379 having provision for producing differential pressures on said clutches.

26. In a hoisting apparatus, the combination with a load carrying device, of a traversing support for said device, a pair of ropes therefor including a load sustaining rope and an operating rope, similar movement of which serves to raise or lower said device, and relative movement to operate the same, winding drums for said ropes, a driving motor for the traversing support, a driving motor for the winding drums, a clutch for the operating rope drum, a controlling lever at an operator's stand for controlling the traversing motor, and means on said controlling lever within the grasp of the hand operating the same to control said clutch.

27. In a hoisting apparatus, the combination with a load carrying device, of a traversing support for said device, a pair of ropes therefor including a load sustaining rope and an operating rope, similar movement of which serves to raise or lower said device, and relative movement to operate the same, winding drums for said ropes, a driving motor for the traversing support, a driving motor for the winding drums, a clutch for the holding rope drum, a clutch for the operating rope drum, a controlling lever at an operator's stand for controlling the traversing motor, means on said controlling lever within the grasp of the hand operating the same to control the operating rope drum clutch, a controlling lever adjacent said first-named lever for controlling the drum driving motor, and means on said second-named lever within the grasp of the hand operating the same to control the holding drum clutch.

28. In a hoisting apparatus, the combination with a load carrying device, of a traversing support therefor, a pair of ropes for said device including a load sustaining rope and an operating rope, similar movement of which serves to raise or lower said device, and relative movement to operate the same, winding drums for said ropes, a driving motor for the traversing support, a driving motor for the winding drums, a brake for the traversing support, a clutch for the operating rope drum, a controlling lever at an operator's stand for controlling the traversing motor and its brake, and means on said controlling lever within the grasp of the hand operating the same to control said clutch.

29. In a hoisting apparatus, the combination with a load carrying device, of a pair of ropes therefor, including a load sustaining rope and an operating rope, similar movements of which serves to raise or lower said device, and relative movement to operate the same, winding drums for said ropes, a driving motor for the winding drum, a traversing motor for the load carrying device, a brake for the load sustaining rope drum, a brake for the traversing movement of the load carrying device, a pair of hand levers arranged at the operator's stand, one serving to control simultaneously the traversing motor and the traversing brake and the other the winding drum motor and the drum brake, and a controlling lever upon each hand lever within the grasp of the hand operating the latter, one to control the clutch for the operating rope drum and the other to control the clutch for the load sustaining rope drum.

30. A hoisting apparatus comprising, in combination, a load carrier, a winding drum, a cable, a hoisting motor to drive the drum to hoist the load carrier, a brake to hold the winding drum, pressure fluid means to control the brake, manual controlling devices for the pressure fluid means and speed-responsive means responsive to the descent of the load, adapted to control the pressure fluid means independently of the manual controlling devices.

31. A hoisting apparatus comprising, in combination, a load carrier, a winding drum, a cable, a hoisting motor to drive the drum to hoist the load carrier, a brake to hold the winding drum, pressure fluid means to release the brake, said brake being normally applied, manual controlling devices for the control of the pressure fluid means and speed-responsive means responsive to the descent of the load, adapted to control the pressure fluid to apply the brake independently of the manual controlling devices.

32. A hoisting apparatus comprising, in combination, a load carrier, a winding drum, a cable connecting the same, a motor to drive the drum to hoist the load, a brake to hold the drum, a brake controlling circuit, motor controller and speed-responsive means to coordinately control the brake controller and change motor controlling circuits.

33. A hoisting apparatus comprising, in combination, a load carrier, a winding drum, a cable connecting the same, a motor to drive the drum to hoist the load, a brake to hold the drum, a brake controller, manual means for operating the same, motor controlling circuits and speed-responsive means responsive to the descent of the load to apply the brake independently of the manual operating means and simultaneously change motor controlling circuits.

34. In a machine of the class described, the combination of two drums; two lines running from said drums to a single load; a single drive for both drums having relation to the lines to wind them simultaneously; a clutch for each of said drums; and fluid pressure actuating devices, one for each clutch comprising controlling means for said devices for varying the relative engagement of one of the clutches to keep the tension on both lines as they are wound.

35. In a machine of the class described, the combination of a clam shell; a hoisting line; a hoisting drum for said line; a closing line; a closing drum for said closing line; fluid actuated clutches for said drums; and a valve device controlling said clutches comprising means to connect the hoisting clutch with the supply and the closing clutch with the supply and comprising devices for reducing the supply pressure on the closing clutch.

36. In a hoisting apparatus, the combination with a load carrying device, of a pair of ropes therefor including a load sustaining rope and an operating rope, winding drums for said ropes, a driving motor for said drums, clutches for said drums, a brake for said drums, a controlling lever at an operator's stand for controlling said motor and brake, means on said lever within the grasp of the hand operating the same to control the clutch for the load sustaining rope drum, and an adjacent lever for controlling the clutch for the operating rope drum.

37. In a hoisting apparatus, the combination with a load carrying device, of a traversing support therefor, a pair of ropes for said device including a load sustaining rope and an operating rope, winding drums for said ropes, a driving motor for the traversing support, a driving motor for the drums, clutches for said drums, brakes for said motors, a controlling lever at an operator's stand for controlling the traversing motor and its brake, means on said lever within the grasp of the hand operating the same to control the clutch for the operating rope drum, an adjacent lever for controlling the drum driving motor and brake, and means on said last-named lever within the grasp of the hand operating the same to control the clutch for the load sustaining rope drum.

38. A hoisting apparatus comprising in combination a clam-shell bucket and controlling instrumentalities therefor including a holding line, a closing line, a holding drum for the holding line, a closing drum for the closing line, driving mechanism for said drums, clutches for said drums, fluid pressure controlling means for said clutches, valve means for controlling said fluid pressure means, and a valve controlling member having a plurality of positions, in one of which the clutch for the closing drum alone is applied, in another of which the clutch for the holding drum alone is alone applied, and in another of which the clutches are simultaneously applied with the greater pressure on the holding drum clutch than upon the opening and closing drum clutch.

39. A hoisting apparatus comprising in combination a clam-shell bucket and controlling instrumentalities therefor including a holding line, a closing line, a holding drum for the holding line, a closing drum for the closing line, driving mechanism for said drums, clutches for said drums, fluid pressure controlling means for said clutches, valve means for controlling said fluid pressure means, and a valve controlling member having a plurality of positions, on one of which the clutch for the closing drum alone is applied, in another of which the clutch for the holding drum alone is alone applied, and in another of which the clutches are simultaneously applied.

40. A hoisting apparatus comprising in combination a clam-shell bucket and controlling instrumentalities therefor including a holding line, a closing line, a holding drum for the holding line, a closing drum for the closing line, driving mechanism, clutches for said drums, and a controlling member for said clutches having a plurality of positions, in one of which the closing drum alone is applied, in another the holding drum alone applied, and in the third position both clutches simultaneously applied with the greater pressure exerted on the holding drum clutch.

41. A hoisting apparatus comprising in combination a clam-shell bucket and controlling instrumentalities therefor including a holding line, a closing line, a holding drum for the holding line, a closing drum for the closing line, driving mechanism, clutches for said drums, and a controlling member for said clutches having a plurality of positions, in one of which the closing drum alone is applied, in another the holding drum alone applied, and in the third position both clutches simultaneously applied.

42. A hoisting apparatus comprising a clam-shell bucket, a hoisting line, a closing line, a hoisting drum for the hoisting line, a closing drum for the closing line, a single guide for said drums having relation to the lines to wind them simultaneously, clutches for said drums, fluid pressure devices for actuating said clutches, and means for controlling said fluid pressure devices to simultaneously apply said clutches while automatically applying a greater pressure to the clutch for the hoisting line than to the clutch for the opening and closing line.

43. A hoisting apparatus, comprising in combination a clam-shell bucket and controlling instrumentalities therefor including controlling cables, a pair of friction clutches controlling the same, pressure fluid devices for controlling said clutches, and means for controlling the pressure fluid for the actuation of said clutches including devices providing for an equivalent increase of pressure on one clutch as the pressure on the other clutch is decreased.

44. A hoisting apparatus, comprising in combination a clam-shell bucket and controlling instrumentalities therefor including sustaining cables, a pair of friction clutches controlling the same, and a device for controlling the pressure on said clutches with means for providing an equivalent increase of pressure on one clutch as the pressure on the other clutch is decreased.

45. A hoisting apparatus comprising in combination a clam-shell bucket and controlling instrumentalities therefor including controlling cables, a pair of friction clutches, a pressure fluid device for actuating each clutch, valve means for conjointly controlling said clutches, and a controlling device having a plurality of positions, in one of which one clutch alone is applied and in another position both clutches simultaneously applied under different pressures.

46. A hoisting apparatus comprising in combination a clam-shell bucket and controlling instrumentalities therefor including controlling cables, a pair of friction clutches, a pressure fluid device for actuating each clutch, valve means for conjointly controlling said clutches, and a controlling device having a plurality of positions, in one of which one clutch alone is applied, in another of which the remaining clutch is applied, and in another of which both clutches are simultaneously applied.

47. In a hoisting apparatus, the combination with a clam-shell bucket, of an opening and closing line, a hoisting line, a winding drum for each line, driving mechanism, a friction clutch between each drum and its driving mechanism, pressure fluid devices to control said clutches, valve means to control the pressure fluid devices, and a controlling member having a plurality of positions for applying said clutches separately or together.

48. A hoisting apparatus comprising in combination a clam-shell bucket and controlling instrumentalities therefor comprising controlling cables, a pair of friction clutches, a controlling member for said clutches having a plurality of positions, in one of which one of said clutches alone is applied, another in which both clutches are simultaneously applied, and in a third of which the remaining clutch alone is applied.

49. A hoisting apparatus having control winding drums with cables therefor, driving mechanism, a pair of friction clutches for said drums, pressure fluid means for applying said clutches, and a control member for said pressure fluid means having a variety of positions for applying said clutches separately or together.

50. In a hoisting apparatus, the combination with a pair of controlling cables and winding drums therefor, a pair of friction clutches controlling said drums, pressure fluid means, and a common control member for interdependently controlling said pressure fluid means.

51. In a hoisting apparatus, the combination with a clam-shell bucket, a pair of friction clutches for controlling the same, pressure fluid devices for applying said clutches, valve means conjointly controlling the clutches, and a common member connected to move said valve means.

52. A hoisting apparatus comprising in combination a clam-shell bucket and controlling instrumentalities therefor including controlling cables, a pair of clutches, pressure fluid means for controlling said clutches, valve means for the conjoint control of said clutches, and controlling devices for controlling said valve means.

53. A hoisting apparatus comprising in combination a clam-shell bucket with controlling cables, a pair of friction clutches, a pressure fluid device for each clutch, a valve for each pressure fluid device, and a controlling device for conjointly controlling said valves.

In testimony whereof, I have signed my name to this specification in the presence of two subscribing witnesses.

ALMON E. NORRIS.

Witnesses:
ROBERT H. KAMMLER,
HENRY T. WILLIAMS.